April 5, 1955  G. B. LITCHFORD  2,705,793
AIRCRAFT NAVIGATION SYSTEMS
Filed Nov. 15, 1950  3 Sheets-Sheet 1

INVENTOR
GEORGE B. LITCHFORD
BY
Paul B. Hunter
ATTORNEY

April 5, 1955     G. B. LITCHFORD     2,705,793
AIRCRAFT NAVIGATION SYSTEMS
Filed Nov. 15, 1950     3 Sheets-Sheet 2
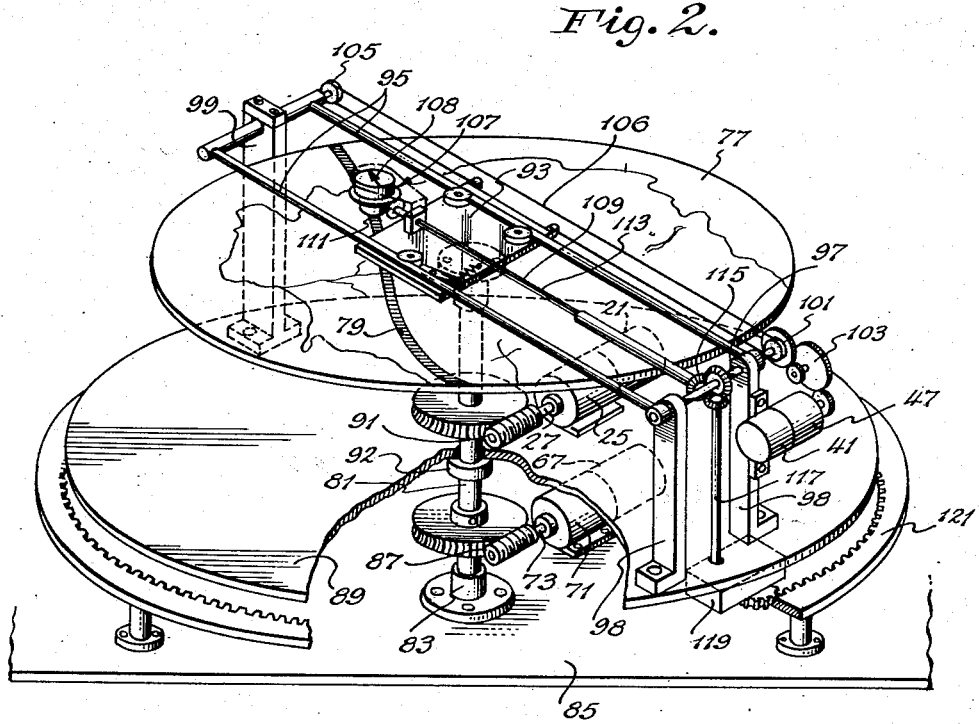
Fig. 2.
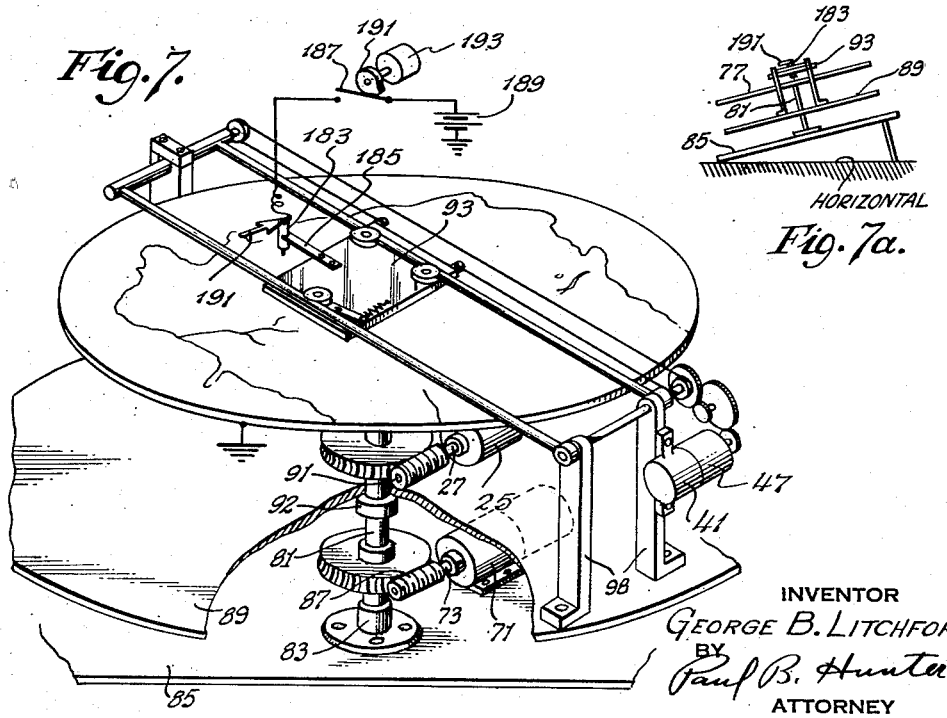
Fig. 7.
Fig. 7a.
INVENTOR
GEORGE B. LITCHFORD
BY
Paul B. Hunter
ATTORNEY April 5, 1955   G. B. LITCHFORD   2,705,793
AIRCRAFT NAVIGATION SYSTEMS
Filed Nov. 15, 1950   3 Sheets-Sheet 3

TO AMPLIFIER AND
AUTOPILOT TURN CONTROL

INVENTOR
GEORGE B. LITCHFORD
BY
Paul B. Hunter
ATTORNEY

United States Patent Office 2,705,793
Patented Apr. 5, 1955

2,705,793

AIRCRAFT NAVIGATION SYSTEMS

George B. Litchford, Cold Spring Harbor, N. Y., assignor to The Sperry Corporation, Great Neck, N. Y., a corporation of Delaware Application November 15, 1950, Serial No. 195,761

7 Claims. (Cl. 343—16)

This invention relates to improvements in radio aids to navigation of mobile craft such as aircraft, and more particularly to systems for guiding an aircraft to follow a predetermined track or flight path.

One of the principal objects of the invention is to provide systems including radio distance measuring and azimuth determining equipment with apparatus for co-ordinating the information derived by said equipment and for converting said information to a form which is more directly useful in steering a craft to follow a desired track.

Another object is to provide improved pilot's indicator devices for displaying the craft's position, heading and track on a map which represents the service area of a ground or reference station.

A further object is to provide apparatus for utilizing radio-derived azimuth and distance information, together with a graphical representation of the flight path to be followed, to produce left-right control signals suitable for actuating a conventional left-right indicator and/or the turn control of an automatic pilot system.

Figure 1:
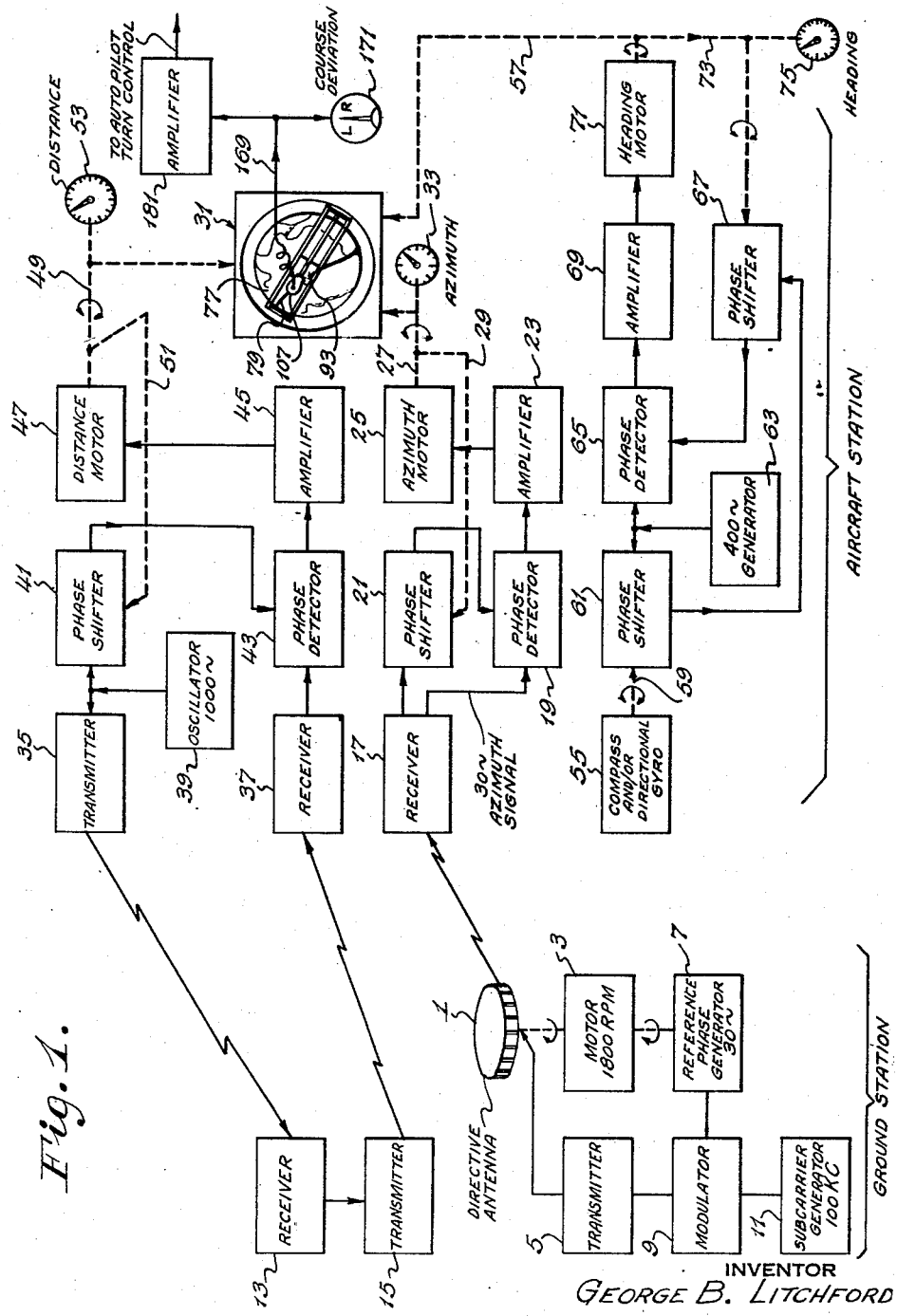
Figure 3:
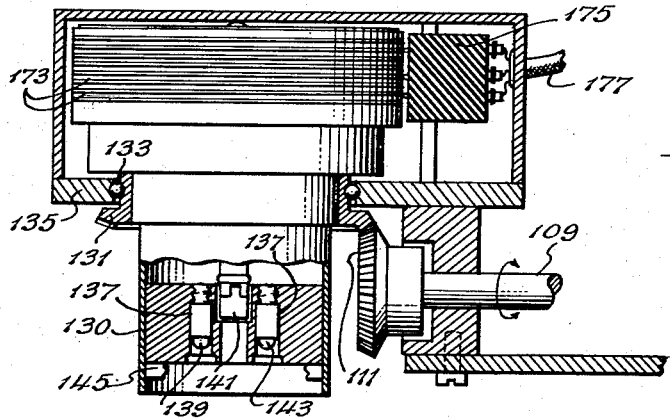
Figure 4:
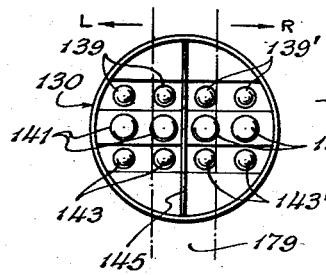
Figure 5:
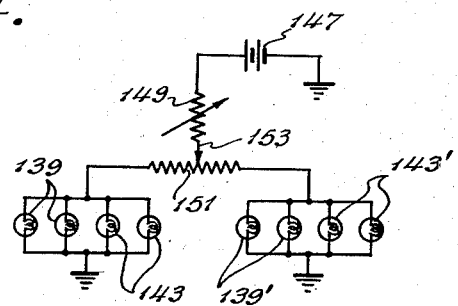
Figure 6:
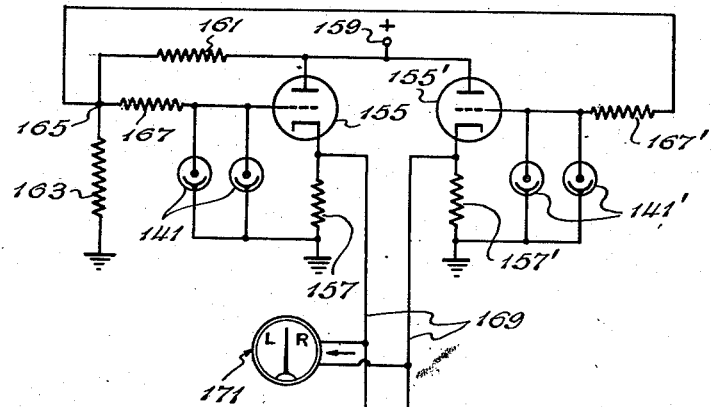

The invention will be described with reference to the accompanying drawings, wherein:

Fig. 1 is a schematic block diagram of a complete navigation system embodying the invention, showing the apparatus at a ground station and also that at one aircraft station, Fig. 2 is a perspective view of track follower or computer mechanism according to the present invention and suitable for use in the system of Fig. 1, Fig. 3 is a view in elevation of a photoelectric pickup head used in the device of Fig. 2, Fig. 4 is a bottom plan view of the pickup head rotated 90° with relation to Fig. 3, Fig. 5 is a schematic diagram of the circuit of the exciting lamps in the pickup head of Fig. 3, Fig. 6 is a diagram of the photoelectric cells and pre-amplifier in the pickup head, Fig. 7 shows a modified form of cursor for use in the mechanism of Fig. 2 for recording the track followed by a craft when the device is used as a pilot's indicator, and Fig. 7a is a diagram showing the structure of Fig. 7 mounted in a tilted position to effect heading indication by means of a pendulous pivotally mounted pointer.

The ground station equipment shown at the left hand side of Fig. 1, includes an omnidirectional radio range transmitter system, comprising a directive antenna 1 rotated continuously by a motor 3 to radiate the output of a transmitter 5 in a modulated space pattern. Throughout Fig. 1, single solid lines are used to denote all electrical connections between the various elements, and dash lines indicate mechanical connections such as shafts. It is to be understood that each solid connecting line may represent two or more individual conductors, as required in the instance. The motor 3 also drives a reference phase generator 7 whose output is applied to a modulator 9 to modulate a subcarrier signal generated by an oscillator or signal generator 11. The modulated subcarrier is in turn applied to the transmitter 5 to modulate its high frequency carrier. By way of example, the transmitter 5 may operate with a carrier frequency of 5000 megacycles per second; the subcarrier frequency of the generator 11 may be 100 kilocycles per second; the directive pattern of the antenna 1 may be rotated by the motor 3 at 1800 R. P. M., and the reference phase generator 7 may operate at the corresponding frequency of 30 cycles per second.

The above described omnidirectional radio range transmitter equipment, and the associated receiver equipment to be described, may be of the two-channel fine and coarse type described and claimed in copending patent application Serial No. 782,722, filed October 29, 1945, by George B. Litchford and Joseph Lyman and entitled Omni-Azimuth Guidance System. However, in this application only the single coarse channel will be described since that is sufficient for a clear understanding of the present invention.

The ground station also includes distance measuring equipment comprising a receiver 13 and a transmitter 15 connected to be modulated by the output of the receiver 13. The transmitter 15 may be omitted, if desired, and the receiver 13 connected to modulate the omi-range transmitter 5 in addition to the modulation from the modulator 9.

The mobile or aircraft station includes a receiver 17 responsive to the ground transmitter 5 to reproduce the 30 cycle reference phase signal of the generator 7 and also the 30 cycle space pattern modulation caused by rotation of the directive antenna 1. The latter signal is applied directly to a phase detector 19, while the reference phase signal goes through an adjustable phase shifter 21 to the phase detector 19. The output of the phase detector is amplified by an amplifier 23 and applied to a reversible motor 25.

The shaft 27 of the motor 25 is coupled, as schematically indicated by the dash line 29, to the phase shifter 21 so that rotation of the motor 25 changes the amount of phase shift introduced in the reference phase signal. The motor shaft 27 is connected to a track follower or computer mechanism 31, to be described, and may also drive an azimuth indicator 33. The motor 25 and phase shifter 21 may be physically incorporated within the mechanism 31, but are shown separately therefrom in Fig. 1 for clarity.

The above described apparatus maintains the motor shaft 27 at an angular position corresponding to the direction of the mobile station from the reference or ground station in the following manner. Rotation of the directive pattern of the antenna 1 by the motor 3 causes the signal received therefrom at the mobile station to be modulated at 30 cycles per second (i. e. 1800 cycles per minute). The reference phase generator 7 produces a 30 cycle signal which is synchronous with the antenna rotation. The phase relationship between the reference phase signal and the rotation modulation signal at the receiver 17 depends upon and is a measure of the azimuth of the mobile station from the reference station.

The phase detector 19 may be of the balanced modulator or other known type of circuit having the characteristic that it produces zero output when the two inputs to it have a predetermined phase relationship, and provides output whose magnitude and polarity depend upon the amount and sense respectively of any deviation from said relationship. The phase detector output, after amplification in the amplifier 23, energizes the motor 25 to drive the phase shifter 21 in such direction as to reduce the deviation of the reference signal from the predetermined phase relationship with the 30 cycle azimuth signal. When such relationship is attained, there is no output from the phase detector 19 and the motor is deenergized until a change in phase of the azimuth signal occurs. Thus the phase shifter 21, phase detector 19, amplifier 23, and motor 25 constitute a phase responsive servo system which maintains the shaft 27 substantially continuously at an angular position corresponding to the phase difference between the two 30 cycle outputs from the receiver 17, and hence corresponding to azimuth.

The distance measuring equipment at the mobile station includes a transmitter 35 designed to cooperate with the ground station receiver 13, and a receiver 37 designed to respond to the ground station transmitter 15. An oscillator 39, which may for example operate at 1000 cycles per second, is connected to modulate the transmitter 35, and is also connected through an adjustable phase shifter 41 to a phase detector 43. The output of the receiver 37 goes to the phase detector 43 for comparison with the output of the phase shifter 41. The output of the phase detector 43 is amplified by an amplifier 45 and applied to a reversible motor 47.

The shaft 49 of the motor 47 is coupled by means 51 to the phase shifter 41, and to the mechanism 31. As in the azimuth channel previously described, the motor 47 and phase shift 41 may be structurally incorporated in the device 31. A distance indicator 53 may be provided on the shaft 49, or coupled thereto by suitable means.

The described distance measuring equipment operates as follows. The wave transmitted from the mobile transmitter 35 is modulated at 1000 cycles per second. This modulation appears in the output of the ground receiver 13 and modulates the transmitter 15. The mobile receiver 37 reproduces the 1000 cycle modulation. This reproduced modulation is delayed with respect to the output of the oscillator 39 by twice the time required for radiation to travel the distance between the mobile and reference stations, plus a small fixed delay introduced by the circuits in the transmitters and receivers. Thus the phase difference between the 1000 cycle output of the receiver 37 and the 1000 cycle output of the oscillator 39 depends on and is a direct measure of the distance.

The phase detector 43, phase shifter 41, amplifier 45 and motor 47 cooperate like the corresponding elements 19, 21, 23 and 25 in the azimuth channel as a phase responsive servo system to set the shaft 49 at a position corresponding to the distance. The fixed delays in the radio equipment may be compensated by mechanical adjustment of the zero position of the phase shifter 41 with respect to the shaft 49.

In addition to the distance measuring and azimuth determining equipment, the mobile station includes a heading system comprising a compass 55 and a servo system controlled thereby to position a shaft 57 according to the heading of the craft. The compass 55 may be of the magnetic type such as a flux valve, or a directional gyro, or a known combination of both wherein the gyro drift is corrected automatically by the magnetic compass. The compass 55 is coupled by a shaft 59 to a phase shifter 61.

An A. C. generator 63, operating at for example 400 cycles per second, is connected to the phase shifter 61 and to a phase detector 65. The output of the phase shifter 61 goes through a second phase shifter 67 to the phase detector 65. The output of the phase detector 65 is amplified by an amplifier 69 and applied to a reversible motor 71 whose output shaft 57 is coupled by means 73 to the phase shifter 67. The shaft 57 is coupled to the mechanism 31 and to a heading indicator 75. As in the azimuth and distance channels, the motor 71 and phase shifter 67 may be located inside the device 31.

The compass 55 positions the shaft 59 according to the craft's heading, adjusting the phase shifter 61 accordingly. The 400 cycle signal input to the phase shifter 67 thus differs in phase from the signal reaching the phase detector 65 directly from the generator 63 by an amount corresponding to the heading. The detector 65, phase shifter 67, amplifier 69 and motor 71 cooperate like the corresponding elements in the azimuth and distance channels, and maintain the heading shaft 57 in positional agreement with the compass shaft 59.

Fig. 2 shows the mechanism in the computer or track follower 31. It includes a table 77 adapted to carry a map or graph bearing a line 79 representing the course to be followed by the craft, and is supported on a shaft 81 which is rotatable in a bearing 83 secured to a base 85. The base 85 may be fixed to the body of the mobile craft. The heading motor 71 is fastened to the base 85, and its shaft 73 is coupled through gears 87 to the shaft 81.

An intermediate table or supporting member 89, hereinafter referred to as the "azimuth deck," is mounted for rotation about the shaft 81, upon a collar 92 or equivalent bearing means. The azimuth motor 25 is secured to the azimuth deck, with its shaft 27 coupled to the shaft 81 through gears 91. A carriage or cursor 93 is supported above the table 77 for motion radially thereof on guide means such as a pair of parallel rods 95. The guide rods may be pivotally supported at one end upon a shaft 97, allowing the guide and carriage assembly to be swung up off the table 77 to facilitate changing the map or graph thereon. The shaft 97 is supported on uprights 98 secured to the azimuth deck 89. A column 99 on the azimuth deck supports the other end of the guide means when in the operating position as shown.

A driving pulley or drum 101 is also carried on the shaft 97, and is coupled by gears 103 to the shaft of the distance motor 47, which is mounted on the azimuth deck 89. An idler pulley 105 is provided at the other end of the guide rods 95, and a string or cable 106 passes around both pulleys 101 and 105 and is secured to the cursor or carriage 93.

A pickoff device 107, to be described in detail hereinafter, is supported on the carriage 93 for rotation in a plane parallel to the table 77 by means of a shaft 109 coupled to it through miter or bevel gears 111. The shaft 109 extends parallel to the guide rods 95, and includes a spline connection at 113 to permit lineal motion of the carriage 93 on the rods 95. Miter gears 115 couple the shaft 109 to a further shaft 117 which extends down to a reduction gear train 119 on the azimuth deck. The shaft 117 is coupled through the gear train 119 to a large internally toothed ring gear 121 which is fastened to the base 85, concentrically with the axis of the shaft 81.

In the operation of the system thus far described, the map or chart, with the representation 79 of the desired flight path, is placed on the table 77 in such manner that the point thereon corresponding to the location of the ground or reference station is at the center, i. e. on the axis of the shaft 81. The orientation of the chart on the table is also fixed so that a given direction on the chart, such as North, is always along a certain line on the table. This may be facilitated by providing suitable indexing marks or means, not shown, on the table and the chart.

When the radio and servo systems shown in Fig. 1 are in operation, the heading motor 71 rotates the table 77 to make the direction of North on the chart correspond to the actual direction of North. The motor 25 rotates the azimuth deck 89 to an angular position with respect to the table 77 corresponding to the azimuth of the mobile station with respect to the reference station. Thus the guide rods 95 are maintained parallel to a line corresponding to that between the reference and mobile stations.

The distance motor 47, by way of gears 103 and pulley 101, drives the carriage 93 to a position such that the radial distance of the center of the pickoff device 107 from the center of the table 77 is related by some predetermined factor to the actual distance of the mobile station from the reference station. This factor depends upon the mechanical drive ratios in the distance measuring system, and the frequency of the oscillator 39, and is equivalent to the map scale factor of the chart. By way of example, the chart may be made ten inches in diameter, covering a service area 50 miles in diameter. In this case the scale factor would be five miles per inch.

By the foregoing operation, the center of the pickoff device 107 is substantially continuously positioned over the point on the table 77 which corresponds to the map position of the mobile station, and as the craft moves with respect to the earth, the pickoff moves accordingly with respect to the table 77. The pickoff 107 has an axis of symmetry corresponding to the longitudinal axis of the craft. This axis is represented in Fig. 2 by an arrow 108. The drive train from the stationary ring gear 121, through shafts 117 and 109, is designed so that the axis represented by the arrow 108 is kept at a constant angular position with respect to the base 85, independently of the motion of the able 77 by the heading motor 71. Thus the direction of the arrow 108, referred to the table 77, is the heading of the craft.

Figs. 3 and 5 show the presently preferred design of the pickoff device 107. A cylindrical head 130 (Fig. 3) is supported within and fixed to the driven element 131 of the miter gearing 111. The gear 131 is rotatably supported by a bearing 133 on a plate 135, which is secured to the carriage 93. The head 130 includes a plurality of longitudinally (i. e. vertically) extending holes or bores 137, arranged as shown in Fig. 4 in the three rows of four each. The first row of holes, shown as the upper row in Fig. 4, contains miniature incandescent lamps 139 and 139'. The intermediate row contains photoelectric cells 141 and 141', and the lower row contains four more lamps 143 and 143'.

A thin opaque partition 145 extends downwardly as shown in Fig. 3 from the lower surface of the head 130, separating the left hand group including lamps 139, photocells 141 and lamps 143, from the right hand group comprising lamps 139', photocells 141', and lamps 143'. The plane of the partition 145 corresponds to the heading axis or axis of symmetry of the pickoff, referred to above in connection with Fig. 2.

Referring to Fig. 5, the exciter lamps 139 and 143 are connected in parallel as one group, and the lamps 139' and 143' are connected similarly as another group. A supply source such as a battery 147 is connected to both groups through an adjustable resistor 149 and a current dividing device comprising a resistor 151 with an adjustable tap 153. The total current through all of the lamps may be regulated by the resistor 143, and the currents through the left and right hand groups may be balanced by the resistor 151.

The photocells are connected as shown in Fig. 6 to a preamplifier which comprises two tubes 155 and 155' connected as cathode followers, with their respective load resistors 157 and 157' in the cathode circuits and their anodes connected directly to the positive anode potential supply terminal 159. A voltage divider network comprising resistors 161 and 163 is connected across the anode supply terminals 159 and ground. The junction 165 between the resistors 161 and 163 supplies polarizing voltage to the photocells 141 and 141', by way of resistors 167 and 167' respectively. The resistors 167 and 167' are of the order of 10 megohms, while the load resistors 157 and 157' are of the order of 1000 ohms. The cathode followers operate in known manner to reproduce the variations in voltage drop across the photocells as substantially equal variations across the cathode load resistors, thus effecting a large reduction in impedance level without substantial reduction in voltage. The load resistors 157 and 157' are connected to output leads 169, which may extend to a course deviation indicator 171 and/or automatic pilot equipment.

The preamplifier tubes and their associated circuit elements may be contained within the upper portion of the head 130. A slip ring assembly 173 at the top of the pickoff head cooperates with a brush assembly 175 to provide for connection of the above described components therein to the external power supply and signal utilization means, through a flexible cable 177.

For operation with the described photoelectric pickoff, the line representing the desired flight path is made to contrast optically with the base, such as a chart or map, upon which it is drawn. Preferably the line is darker than the base, and is of such width that when its lateral center is directly under the partition 145, its left edge is about midway between the lamps 139 and its right edge is midway between the lamps 139'. This is shown in Fig. 4 by the shaded portion 179 surrounded by broken lines, which represents the track 79 in proportion to the pickup head 130.

When the head 103 is centered over the track 79 as indicated in Fig. 4, the illumination of the photocells 141 by the lamps 139 and 143 is equal to that of the photocells 141' by the lamps 139' and 143'. The voltages across the cathode load resistors 157 and 157' are accordingly equal, and the difference in potential between the output leads 169 is zero. When the head is off to the left of the track, the photocells 141 receive more light than the photocell 141', and conduct more current. This lowers the potential at the grid of the tube 155, producing a corresponding decrease in the drop across the load resistor 157. At the same time, the photocells 141' receive less light, and the drop across the load resistor 157' increases. Thus there is a difference in potential between the output leads 169, the right hand one in Fig. 6 being positive with respect to the left hand lead. Similarly, if the pickup head is off to the right of the track, the left hand lead 169 becomes positive with respect to the right hand lead.

As shown in Fig. 1, the output leads 169 are connected to an amplifier 181 whose output is supplied to the turn control circuit of an automatic pilot, not shown. The amplifier 181 may if necessary include a modulator or inverter for converting the reversible polarity D.-C. signal from the pickoff 107 to a reversible phase A.-C. signal, and may also include differentiating circuits arranged in known manner to add rate components to the variations in the pickoff signal. For the purpose of disclosing the present invention, it is sufficient to note that the automatic pilot is essentially a servo or follow-up system which operates the rudder and ailerons of the aircraft in a direction which depends upon the polarity or sense of the control signal.

The operation of the over-all system is as follows: The chart or map bearing the representation 79 of the desired flight path or track is placed on the table 77 in proper angular relationship with the North or other reference direction thereon, and the radio distance and direction determining equipment functions to drive the pickoff 107 to the present map position of the aircraft. Initially the craft must be maneuvered to bring the pickoff head over a point on the track 79, and in approximately the correct heading. Thenceforth any deviation of the craft from the predetermined flight path causes a corresponding deviation of the pickoff 107 from the track 79, producing a control signal on the leads 169 which makes the automatic pilot steer the craft back to the correct course. This may continue until the craft has flown the entire length of the path represented by the track 79, whereupon the automatic pilot will maintain the craft at its last heading or an operator may take over control.

It will be apparent that the described system can be used to provide any type of flight path, limited only by the minimum turning radius of the craft, and is not restricted to combinations of special turns and rectilinear elements. The relatively simple mechanism shown in Fig. 1 makes a continuous direct comparison between the present craft position and the desired path to give left-right course deviation signals, without any cumbersome computer apparatus for coordinate conversion, as e. g. from polar to rectangular. The accuracy of the present device can easily be made commensurate with that of the best currently available radio distance and direction determining equipment.

The apparatus shown in Fig. 2 is stabilized in heading, i. e. the table 77 is rotated with changes in the craft's heading, like a compass card. This arrangement is not essential; the table 77 may be fixed with respect to the body of the craft, and the pickoff 107 kept in alignment with track 79 by other means, such as a compass repeater connected directly to the shaft 109 or the shaft 117.

Fig. 7 shows a modification of the structure of Fig. 2 for use as a pilot's indicator. In this case the pickoff 107 is replaced by a stylus 183 supported at the end of an arm 185 mounted on the carriage 93. A sheet of facsimile recording paper, not shown, may be placed on the table 77. The stylus 183 is connected through a switch 187 to a source such as a battery 189. The switch 187 may be made to open and close periodically by means of a cam 191 driven by a motor 193.

In the operation of the device of Fig. 7, the stylus 183 is moved, like the pickoff 107 in Fig. 2, according to the motion of the craft. The switch 187 is closed periodically, and the stylus marks a characteristic broken line on the surface of the recording sheet, representing the path followed by the craft. The recording sheet may be provided with a map printed on it, or with other suitable marks or lines to aid the pilot in guiding the craft as desired.

Since the stylus does not need to be oriented according to its direction of motion, the heading drive, like that including the shaft 109 in Fig. 2, may be omitted. Alternatively, indicator means such as a small arrow 191 may be pivotally mounted above the stylus 183, and the entire mechanism may be mounted in a vertical position, or in a tilted position as shown in Fig. 7a. The arrow 191 will hang in a substantially constant position with respect to the base 85 regardless of the position of the stylus over the table 77, and independently of the angular position of the table 77 with respect to the base 85, and thus indicate present heading.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for navigation of a mobile craft, including a table adapted to support a map-like representation of a service area surrounding a reference location, a compass, means controlled by said compass for rotating said table about a point thereon corresponding to said reference location to maintain said representation in alignment with the area represented by it, independently of the heading of said craft, a cursor adjacent said table and guide means supporting said cursor for motion radially with respect to said point, heading indicator means having an axis of lateral symmetry and means supporting said heading indicator on said cursor for rotation about a second axis, perpendicular to said representation, radio distance measuring equipment and means controlled thereby to position said cursor with said second axis at a radial distance from said point corresponding to the distance of said craft from said reference location, radio direction finding equipment and means responsive thereto to rotate said guide means about said point to an angular position corresponding to the direction of said craft from said reference location, means for maintaining said axis of symmetry at an angular position with respect to said representation corresponding to the heading of said craft with respect to said service area, and means for indicating the position of said cursor with respect to said representation.

2. A radio system for navigation of a mobile craft including an omnidirectional radio range transmitter station at a reference loocation, and radio receiver apparatus on said craft and responsive to said transmitter to provide an output corresponding to the direction of said craft from said reference location; distance measuring equipment including means on said craft for transmitting radio signals to said reference location, means at said reference location for retransmitting said signals to said craft, and means on said craft responsive to the time difference between said transmitted signals and said retransmitted signals to provide an output corresponding to the distance of said craft from said reference location; mechanism on said craft including a table adapted to support a map-like representation of a service area surrounding said reference location, a carriage and guide means supporting said carriage adjacent said table for motion of said carriage radially of said table with respect to the point thereon corresponding to said reference location, servomotor means responsive to the output of said radio receiver to direct said guide means parallel to the direction on said table which corresponds to the direction of said craft from said reference location, and servomotor means responsive to the output of said distance measuring equipment to position said carriage at a distance from the point on said table representing said reference location corresponding to the distance of said craft from said reference location.

3. The invention set forth in claim 2, further including a marking device supported on said carriage and adapted to mark a map supported on said table to trace thereon a representation of the path followed by said mobile craft.

4. The invention set forth in claim 3, including a directional indicator device pivoted on said carriage for rotation about the axis of said marking device, and means responsive to the heading of said craft to position said indicator with respect to said table according to said heading.

5. The invention set forth in claim 2, further including a pickoff device rotatably supported on said carriage, said pickoff device having an axis of lateral symmetry, and means responsive to the heading of said craft to position said axis with respect to said table in accordance with said heading.

6. The invention set forth in claim 5, wherein said pickoff device includes a plurality of light sources and a plurality of photoelectric cells arranged symmetrically about said axis of symmetry to produce a control signal corresponding in magnitude and sense to lateral deviation of said axis from a line on said table representing a desired flight path.

7. Apparatus for navigation of a mobile craft, including a rotatable member having a surface adapted to support a representation of a path to be followed by the craft, a compass, means controlled by said compass for rotating said member about a point on said surface to maintain said representation in an orientation corresponding to that of the path represented by it, independently of the heading of the craft; a second member adjacent said surface carrying a representation of the position of the craft and having an axis of lateral symmetry, radio position-determining equipment, and means controlled by said equipment to maintain said representation of the position of the craft at a position relative to that of said first-mentioned representation in substantial map-like correspondence with the position of the craft relative to the path, and means for maintaining said axis of symmetry at an angular position with respect to said first representation corresponding to the heading of the craft relative to said path.

References Cited in the file of this patent

UNITED STATES PATENTS

| | | |
|---|---|---|
| 2,307,029 | Elm | Jan. 5, 1943 |
| 2,422,025 | Luck | June 10, 1947 |
| 2,444,933 | Jasperson | July 13, 1948 |
| 2,467,202 | Gardiner | Apr. 12, 1949 |
| 2,479,569 | Harschel | Aug. 23, 1949 |
| 2,492,148 | Herbold | Dec. 27, 1949 |
| 2,520,595 | Fernsler | Aug. 29, 1950 |
| 2,520,922 | Framme et al. | Sept. 5, 1950 |
| 2,526,682 | Mulberger et al. | Oct. 24, 1950 |
| 2,532,402 | Herbold | Dec. 5, 1950 |
| 2,561,345 | Deloraine | July 24, 1951 |
| 2,569,328 | Omberg | Sept. 25, 1951 |
| 2,616,076 | Lyman et al. | Oct. 28, 1952 |